United States Patent [19]

Hawley

[11] 3,916,596
[45] Nov. 4, 1975

[54] JOINT STRUCTURE
[75] Inventor: Lee E. Hawley, Janesville, Wis.
[73] Assignees: Ronald Hanley; Melvin Enkkeli; Daniel M. Clark; William Bryden
[22] Filed: Dec. 2, 1974
[21] Appl. No.: 528,654

Related U.S. Application Data
[63] Continuation-in-part of Ser. No. 336,532, Feb. 28, 1973, abandoned.

[52] U.S. Cl. .................. 52/758 F; 29/526; 83/637
[51] Int. Cl.² ........................................ F16B 5/02
[58] Field of Search ......... 52/758 F, 758 D; 83/637; 29/407, 465, 526; 403/388

[56] References Cited
UNITED STATES PATENTS

| | | | |
|---|---|---|---|
| 1,982,488 | 11/1934 | Weber | 52/758 F X |
| 3,178,984 | 4/1965 | Barothy | 83/637 |
| 3,228,262 | 1/1966 | Bennett | 29/465 X |
| 3,550,245 | 12/1970 | Davis | 29/407 |
| 3,588,989 | 6/1971 | Hosea | 29/407 |

*Primary Examiner*—Werner H. Schroeder
*Assistant Examiner*—Wayne L. Shedd
*Attorney, Agent, or Firm*—Wolfe, Hubbard, Leydig, Voit & Osann, Ltd.

[57] ABSTRACT

Each one of a series of die parts is secured to and located within a precise position on a common die shoe by means of two joint structures. In each joint structure, a sleeve of a fixed length and diameter is telescoped with a slip fit into a longer opening extending through the die part and into the die shoe to precisely locate the die part on the shoe with respect to the other die parts and with respect to the shoe. The inside diameter of the sleeve is larger in diameter than the diameter of a screw which extends through the sleeve and is threaded into a hole in the die shoe to secure the part on the shoe regardless of whether the axis of the screw coincides precisely with the axis of the sleeve. When mounting the die part on the die shoe, the part first is clamped on the die shoe in an initially accurate position with a bore defining the portion of the opening in the die part serving to locate the position of the hole to be drilled and tapped in the die shoe. Once the hole is drilled and tapped in the die shoe, the screw is telescoped through the bore and threaded into the hole with an adapter captivated between the head of the screw and a shoulder in the bore to temporarily fasten the die part on the die shoe when the screw is tightened down. After all of the die parts are fastened temporarily to the die shoe in a similar manner, the accuracy of the initial positioning of the parts is checked and the parts are machined as required to be shifted into their precise positions with respect to each other and with respect to the die shoe. To complete each joint structure after clamping the part in its precise position on the shoe, the screw and adapter are removed and a second bore is machined in the die shoe utilizing the first bore as a guide to form the other portion of the opening regardless of whether the axis of the completed opening coincides with the axis of the hole. Then, the sleeve is telescoped into the opening to hold the part against moving horizontally out of its precisely located position and the screw is inserted through the sleeve and threaded into the hole to hold the part on the die shoe.

12 Claims, 7 Drawing Figures

JOINT STRUCTURE

CROSS REFERENCES TO RELATED APPLICATIONS

This application is a continuation-in-part of my copending application Ser. No. 336,532 filed Feb. 28, 1973, now abandoned.

BACKGROUND OF THE INVENTION

This invention relates to a joint structure of the type used to locate two or more stacked members with respect to each other and to hold the members together in such positions. More particularly, the invention relates to a joint structure wherein the locating and holding parts of the structure are captivated within a common opening extending between the members.

While there are various applications in which two or more members are located with respect to each other and fastened together utilizing a joint structure of the foregoing general type, a typical application is in the locating and fastening of die parts on a die shoe wherein it is necessary to locate the die parts accurately on the die shoe. One way of accomplishing this is shown in Barothy U.S. Pat. No. 3,178,984 which discloses a screw extending through a conical locating sleeve telescoped into a similarly shaped opening extending through a die part and into a die shoe. The screw is threaded into a hole in the die shoe to hold the sleeve in the opening and to secure the die part on the shoe.

SUMMARY OF THE INVENTION

The primary object of the present invention is to provide a new and improved joint structure of the above general character which in service use substantially reduces the time required to assemble and precisely locate two members with respect to each other while holding tolerances measured to a ten thousandths of an inch. A more detailed object is to accomplish the foregoing by forming the joint structure in a unique manner so that at least two first members are located and fastened on a second member with one opening for each joint structure receiving all the screw and sleeve parts of that joint structure from only one end thereof and regardless of whether the axis of the screw coincides precisely with the axis of the sleeve so that, when precisely locating one of the first members on the second member, the axis of the opening may be offset with respect to the axis of the screw.

The invention also resides in the novel construction of the joint structure with the sleeve having a generally cylindrical shape whose inside and outside diameters are fixed and wherein the outside diameter is substantially equal to the diameter of the opening and the inside diameter is greater than the diameter of the shank of the screw so that, when precisely locating one of the first members on the second member, the first member may be shifted into a precise position with respect to other first members and the second member from an initial position locating the axes of screw receiving holes in the second member.

A further object is to provide the joint structure with a retaining ring which serves to captivate the sleeve on the screw shank so that, as an incident to removing the screw from the second member during disassembly, the sleeve also is removed from the opening.

An additional object is to utilize the foregoing joint structure in providing a unique and particularly simple method of assembling and precisely locating die parts on a die shoe whereby the parts may be shifted from initially accurate positions on the shoe into precisely located positions without shifting the position of the screw with respect to the shoe. Advantageously, the foregoing method is accomplished by first accurately locating the die parts on the die shoe in an initial position and temporarily securing the parts to the shoe while the positions of the parts are checked with respect to the precise positions. Thereafter, if required, the die parts may be removed and machined so that when they are replaced on the die shoe the parts can be shifted into their precisely located positions with respect to each other and with respect to the shoe without having to move the screw. Once the die parts are precisely located on the die shoe, bores which define the portions of the openings in the parts are used as bushings to machine bores in the die shoe to complete the openings regardless of whether the axes of the bores align precisely with the axes of the holes. By virtue of this method, the time previously required to precisely locate the die parts on the die shoe is reduced substantially.

The invention also resides in the novel manner in which a stripper is secured and precisely located on the die parts by utilizing portions of at least two of the joint structures serving to secure and locate separate two different die parts on the die shoe.

These and other objects and advantages of the present invention will become more apparent from the following detailed description when taken in conjunction with the accompanying drawings.

DETAILED DESCRIPTION OF THE PREFERRED EMBODIMENTS

As shown in the drawings for purposes of illustration, the present invention is embodied in a joint structure 10 for precisely locating and fastening an upper member 11 on a lower member 13. While the exemplary joint structure is suited particularly for use in a die assembly 14 wherein a series of upper members in the form of die parts 11 are secured to a lower member or die shoe 13, it will be appreciated that the joint structure is equally well suited for use in locating and securing together other members where precision is required in locating and fastening such members together. Herein, the joint structure comprises a sleeve 15 (see FIG. 1) telescoped into an opening 16 extending through the die part and into the die shoe to locate the part horizontally on the shoe. The shank 17 of a screw 19 extends through the sleeve and is threaded into a hole 20 formed in the shoe and extending downwardly from the lower end 21 of the opening. The screw, thus, secures the sleeve within the opening and anchors the die part on the die shoe.

In accordance with the primary aspect of the present invention, precise location of the die part or upper member 11 relative to the die shoe or lower member 13 is achieved by constructing the joint structure 10 in a novel manner so as to permit the upper member to be shifted horizontally into a precise position relative to the lower member while keeping the screw 19 within the opening 16 and still leaving room for the sleeve to be inserted into the opening to fix the location of the upper member on the lower member. For these purposes, the sleeve is cylindrical in shape having inside and outside wall surfaces 23 and 24 of fixed diametrical dimensions, respectively, related to the diameter of the screw shank 17 and the diameter of the opening 16. The diameter of the inside wall surface is greater than the diameter of the screw shank so that the screw shank will fit within the sleeve regardless of whether the axis 25 of the sleeve coincides with the axis 26 of the screw (see FIG. 2). In addition, means including a horizontal lower surface 27 integrally formed with the head 29 of the screw engages an abutting surface 30 connected to the upper member so as to support the screw vertically within the opening for tightening the upper member toward the lower member. By virtue of the foregoing construction, the upper member may be located precisely on the lower member easily and more quickly than was possible heretofore while achieving tolerances measured to a ten thousandths of an inch.

In the present instance, the joint structure 10 is constructed with the opening 16 comprising an upper portion in the form of a cylindrical bore 31 in the die part 11 and a cylindrical lower portion or bore 33 machined in the die shoe 13. The two bores are of the same predetermined diameter and are aligned coaxially with each other when the die part is located precisely on the die shoe. Formed in the die part around the upper end of the bore 31 is a counterbore 34 whose diameter is substantially larger than the diameter of the bore 31. Accordingly, an annular shoulder 35 is formed within the die part and lies within a horizontal plane extending perpendicular to the axis 25 of the opening.

Figure 1:
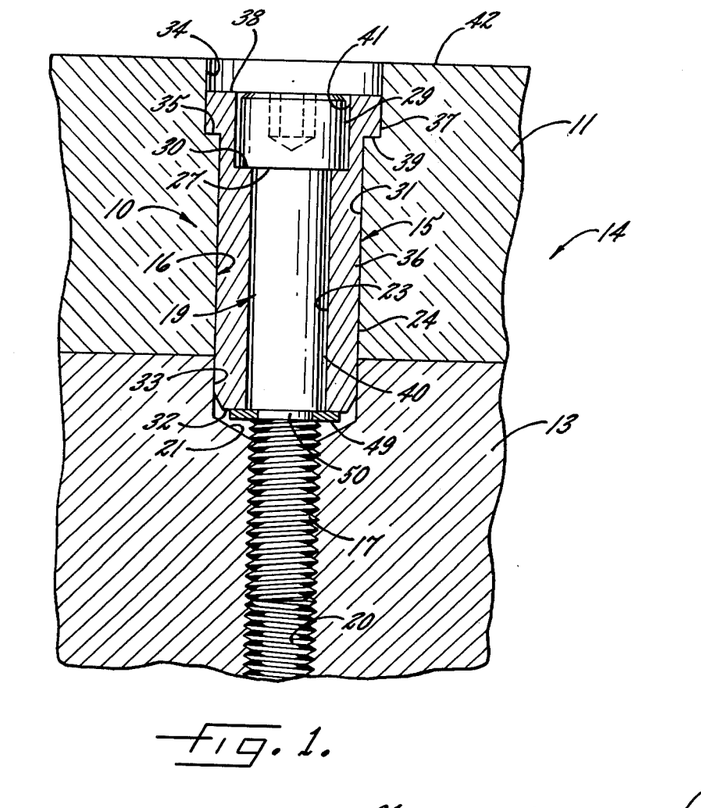
FIG. 1 is an enlarged fragmentary cross-sectional view taken substantially along line 1—1 of FIG. 4.
Figure 2:
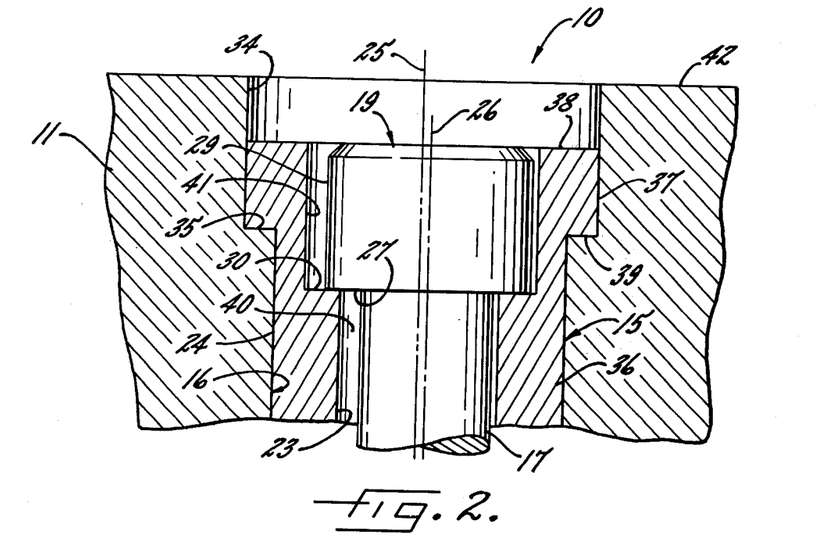
FIG. 2 is an enlarged fragmentary cross-sectional view similar to FIG. 1.

As shown in FIGS. 1 and 2, the sleeve 15 is formed with a cylindrical body 36 having a diameter slightly less than the predetermined diameter of the bores 31 and 33 so as to form a slip fit with both the die part 11 and the die shoe 13 when inserted into the bores. In addition, the length of the sleeve body is substantially less than the combined lengths of the bores 31 and 33 so as to space the lower end 32 of the body upwardly from the lower end 21 of the opening 16. Advantageously, the length of the lower portion of the body extending into the bore 33 is equal to approximately one-fourth of the diameter of the sleeve thereby enabling use of the exemplary joint structure 10 without having to increase the thickness of the die shoe. Integrally formed with the body at the upper end of the sleeve is an annular flange 37 extending radially outward from the body and having a fixed diameter only slightly smaller than the diameter of the counterbore 34 in the die part 11 so as to provide a slip fit between the sleeve and the die part. In addition, the axial thickness of the flange is substantially less than the depth of the counterbore 34 so that the upper end 38 of the sleeve is recessed below the top surface 42 of the die part to enable the die part to be sharpened from time to time without also grinding the sleeve. Accordingly, with the sleeve telescoped into the opening, the underside 39 of the flange abuts the shoulder 35 to support the sleeve within the opening.

To hold the sleeve 15 within the opening 16 and fasten the die part 11 to the die shoe 13, the screw 19 is telescoped through an axial passage 40 defined by the inside wall 23 of the sleeve and is threaded into the hole 20 with the head of the screw nesting within a recess 41 formed in the upper end of the sleeve. Herein, the recess is concentric with the axis 25 of the sleeve, is larger in diameter than the diameter of the axial passage and defines the abutting surface 30 to extend horizontally and perpendicular to the axis of the sleeve. Advantageously, the diameter of the recess also is substantially larger than the diameter of the head 29 of the screw so when locating the die part precisely on the die shoe, it is unnecessary for the axis 26 of the screw to coincide precisely with the axis of the sleeve (see FIG. 2). As a result, the die part may be located on the die shoe precisely in the position desired much easier and more quickly than was possible heretofore.

Figure 3:
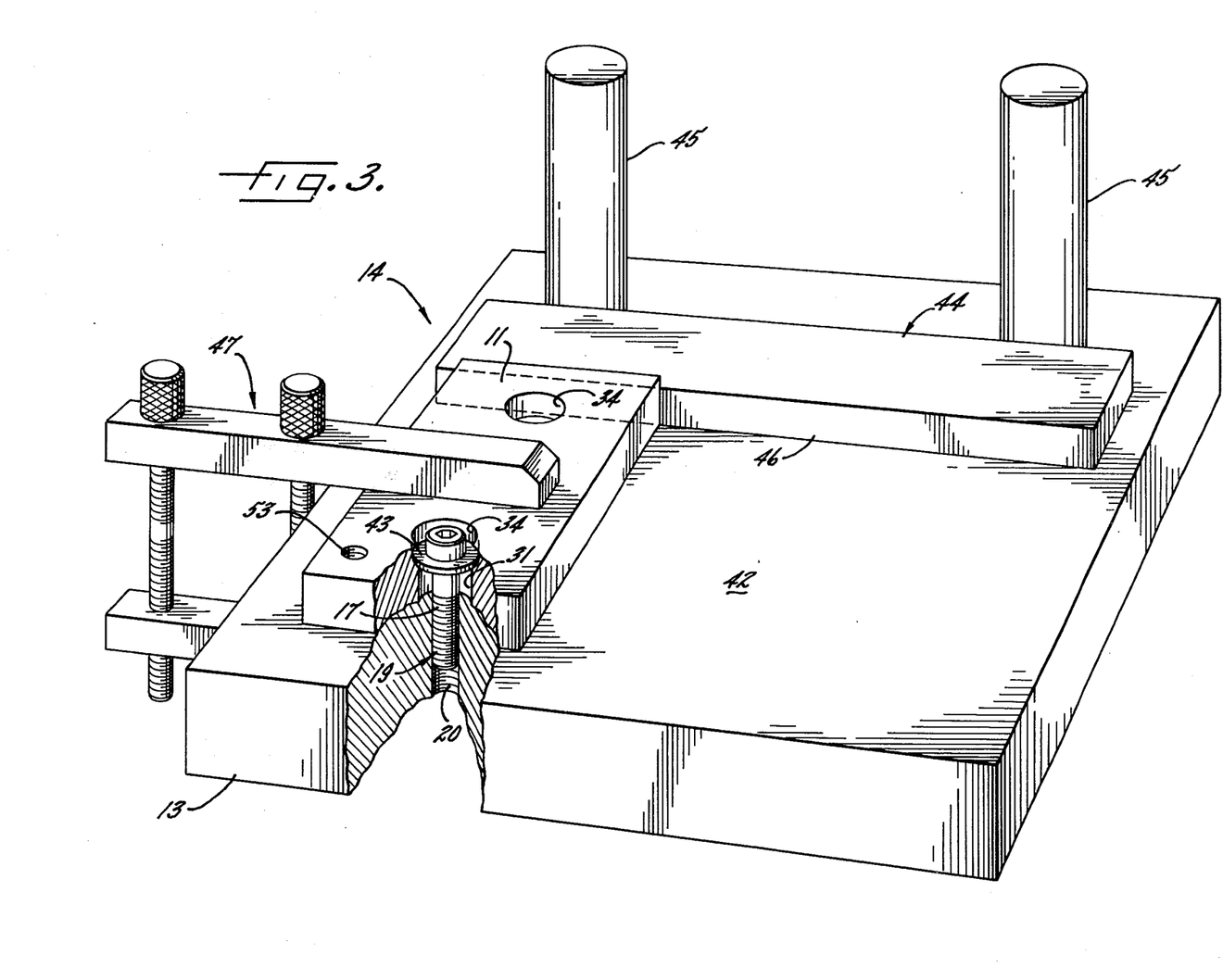
FIG. 3 is a perspective view of a die assembly with parts broken away and showing an intermediate step in assembling the assembly with the exemplary joint structure.

In practicing the novel method of the present invention utilizing the exemplary joint structure 10 to precisely locate a series of the die parts 11 on a die shoe 13 both with respect to each other and with respect to the shoe, the first die part having two bores 31 formed therein is clamped to the die shoe initially in a reasonably accurate position. The bores 31 are then utilized to locate the points on the die shoe at which to machine the two holes 20 for receiving the screws 19 to secure the die part temporarily to the die shoe. Once the two holes are machined in the die shoe, an adapter 43 (see FIG. 3) is telescoped onto the shank 17 and the screws are tightened down to secure the first die part temporarily to the die shoe. The other die parts in the series are mounted adjacent each other temporarily on the die shoe in a similar manner. Once all of the die parts are located in their initial positions, the relative positions of the parts are checked for accuracy both with respect to each other and with respect to the die shoe and are adjusted into precise positions where required to achieve position accuracy to a ten thousandths of an inch. Then, the die parts are clamped to the shoe adjacent each of the screws and the screws and adapters are removed so the bores 31 may be used as guides to machine the bores 33 in the die shoe in the precise positions desired thereby completing the formation of the openings 16. After the bores 33 are machined in the die shoe, the screws and sleeves 15 are inserted into the openings and the screws are tightened in the holes 20 to anchor the die parts to the die shoe. Advantageously, by following the foregoing steps, the series of die parts may be located and fastened to the die shoe quickly and easily to tolerances measured to a ten thousandths of an inch and while working from only one side of the die shoe.

In the present instance, each of the die parts 11 in the series is machined to close tolerances with two of the bores 31 and their respective counterbores 34 being formed in the die part prior to locating and securing the die part on the die shoe 13. To locate the first and successive die parts in reasonably accurate initial positions on the shoe, a machined bar 44 of predetermined width is placed in abutment with two guide rods 45 projecting upwardly from the shoe. The free edge 46 of the bar serves to locate the die parts with respect to the guide rods on the shoe so that when initially locating each die part on the shoe one edge of the die part is placed in abutment with the free edge of the bar (see FIG. 3). Once the first die part is located in its initial position, the part is secured to the die shoe such as by means of a clamp 47 to enable the locations of the holes 20 to be spotted through the two bores 31. After the hole locations are spotted and marked, the clamp is removed and the holes are drilled and tapped in the die shoe. Herein, the holes are drilled and tapped to a depth substantially beyond the depth to which the bores 33 are to be formed in the die shoe. In this way, the length of the holes remaining after the bores 33 are machined in the die shoe is sufficient to provide a strong connection between the screws 19 and the die shoe.

Figure 4:
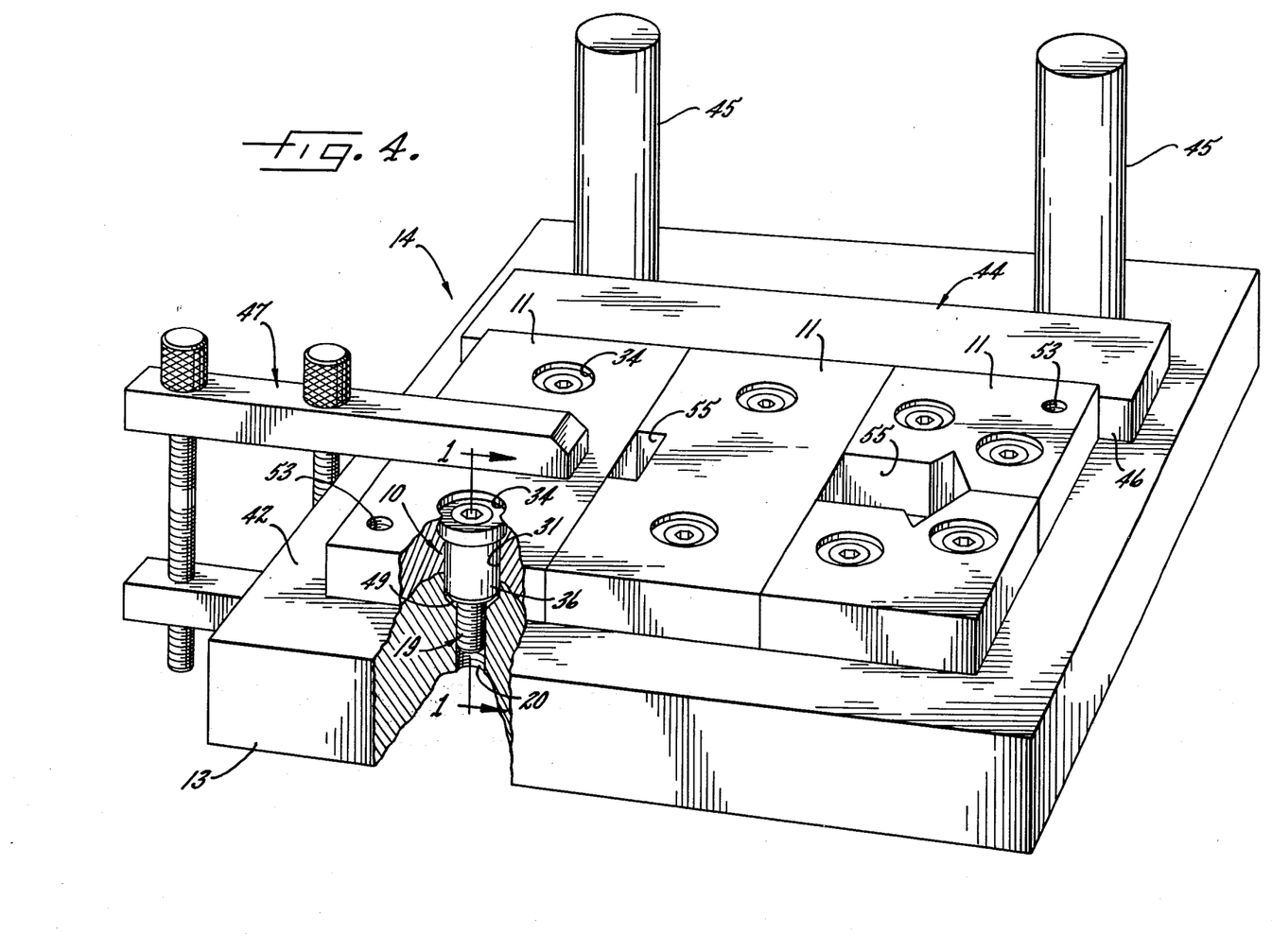
FIG. 4 is a view similar to FIG. 3 showing a final step in assembling the die assembly utilizing a joint structure embodying the novel features of the present invention.

After the holes 20 are drilled and tapped in the die shoe 13, the first die part 11 is replaced and temporarily secured in its initial position on the die shoe. Herein, this is achieved through the use of the adapters 43 which serve to support the screws 19 within their respective bores 31 when securing the die part to the shoe. Preferably, the adapters are in the form of circular disks telescoped onto the screw shanks 17 and abutting the lower surfaces 27 of the heads 29 of the screws. As shown in FIG. 4, the adapters are sized to easily fit within the counterbores 34 and nest against the shoulders 35 in the first die part and yet provide a sufficiently loose horizontal connection between the counterbores and the screws to permit the die part to be shifted horizontally into the location desired when precisely locating all of the die parts with respect to each other on the die shoe.

The remaining die parts 11 of the series are secured temporarily to the die shoe 13 in the same manner as the first die part with each successive die part abutting both the bar 44 and the preceding die part to initially locate such successive die part both with respect to the preceding die part and the die shoe. Once the series of die parts are all fastened to the die shoe in their initial positions, the die shoe is set up on a machine such as a jig bore machine (not shown) and a progression and position check is made to determine the accuracy of the positions of the die parts relative to each other and relative to the die shoe preparatory to machining the bores 33 in the die shoe.

Even though extreme care is taken in initially locating the die parts 11 on the die shoe 13, it is often necessary to shift one or more of the die parts horizontally in order to precisely locate punch holes 55 (FIG. 4) in the parts both with respect to each other and with respect to the die shoe. This, of course, means that some of the die parts must be removed from the die shoe and machined so that when the edges of the die parts abut each other on the shoe the parts are located precisely in the position desired. By virtue of the way in which the die parts are temporarily fastened to the die shoe, the parts may be removed from the die shoe without having to remove the shoe from the jig bore machine. Accordingly, those die parts which need to be removed from the die shoe for machining so that they can be located precisely on the die shoe may be removed, machined as required and replaced without having to go through the complicated process of again setting up the die shoe on the jig bore machine for a progression and position check. In addition, the advantageous construction of the exemplary joint structure 10 enables the correctly ground die parts to be shifted horizontally into the precise positions desired regardless of whether the axes 26 of the screws 19 coincide precisely with the axes 25 of the bores 31.

Once all of the die parts 11 are precisely located and temporarily secured on the die shoe 13 by the screws 19 and adapters 43, the bores 33 are machined in the die shoe using the bores 31 as guides for precise location of the bores 33 in the shoe. Preferably, each bore 31 is machined in the shoe by first clamping the precisely located die part to the die shoe with the clamp 47 being located adjacent the bore 31 which is to be used as a guide in machining the bore 33 in the die shoe. Then, the screw and adapter are removed from the bore 31 and the bore 33 is machined in the die shoe to a depth greater than one-fourth the outside diameter of the sleeve thereby completing the opening 16. Herein, the bore 33 is machined in the die shoe by first drilling with the jig bore machine and then pre-reaming and reaming the bore to a diameter to form a slip fit with the sleeve 15. After the bore 33 is completed in the die shoe, the screw 19 is telescoped into the sleeve and a clip ring 49 (see FIGS. 1 and 3) is mounted on the screw within an annular notch 50 in the screw to hold the sleeve on the screw. Then, the sleeve and screw assembly is inserted in the completed opening 16 to hold the die part against horizontal movement and the screw is tightened down to secure the die part on the die shoe.

Advantageously, the clip ring 49 aids in removing the sleeve 15 from the opening 16 when it is necessary to separate the die part 11 from the die shoe 14 for sharpening. This is because as the screw 19 is turned out of the hole 20 the ring carries the sleeve upwardly with the screw. Herein, the depth of the hole below the lower end 21 of the opening is greater than the depth of the counterbore 34 so that, once the screw is unthreaded from the hole, the upper end of the sleeve including the flange 37 is exposed above the top surface 42 of the die part and thus may be grasped for easy removal of the sleeve and screw assembly from the die part.

Figure 5:
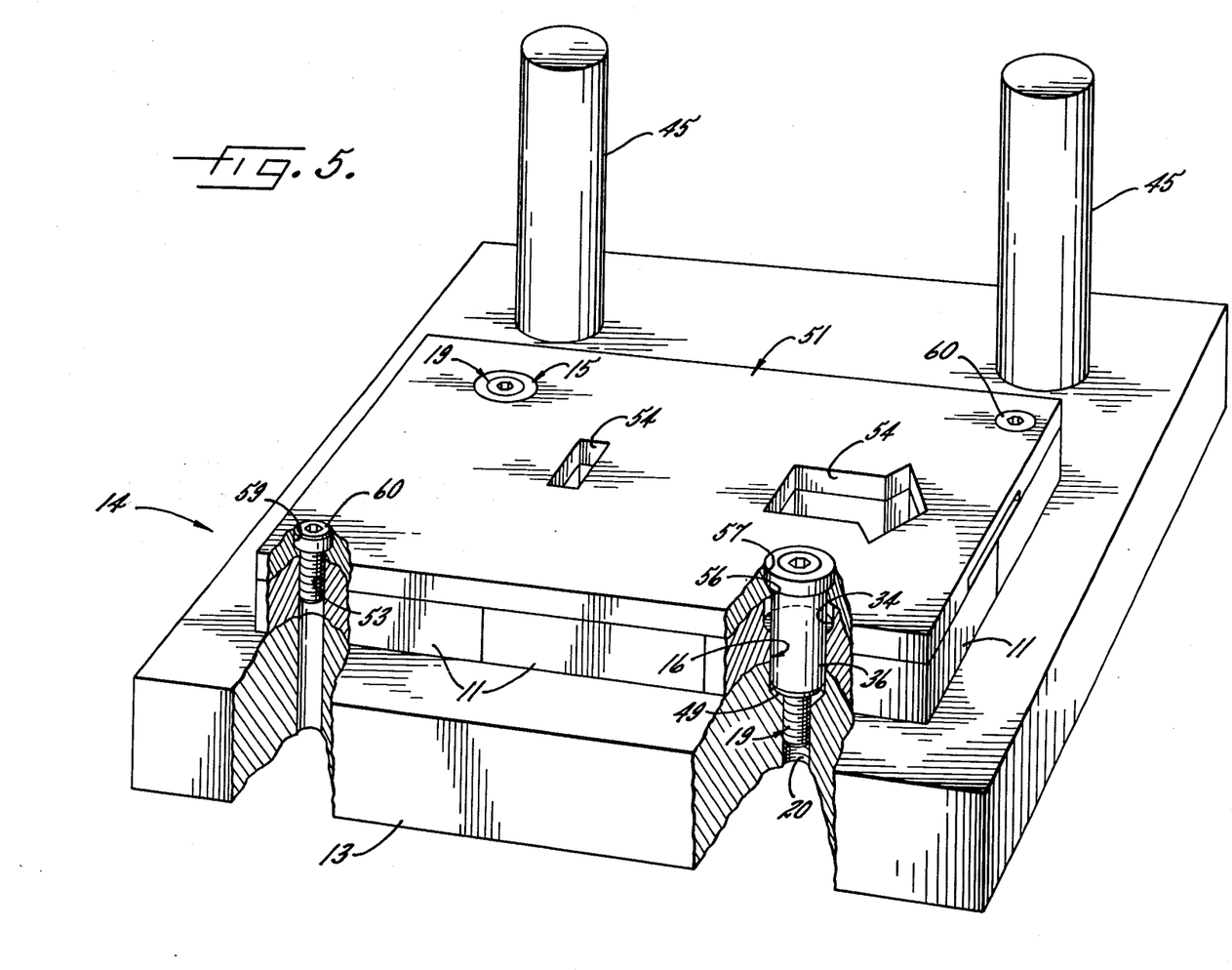
FIG. 5 is a perspective view of a die assembly with parts broken away and showing a final step in mounting a stripper on the die assembly utilizing the joint structure of the present invention.

To complete the die assembly, a stripper 51 (see FIG. 5) is secured to the die parts 11 in a manner similar to the way in which the die parts are secured to the die shoe 13 and while the die shoe is still set up on the jig bore machine. First, two assemblies of sleeves 15 and screws 19 are removed from one opening 16 in each of two different die parts 11 adjacent opposite ends of the shoe and the assemblies are replaced with temporary fastenings comprised of two of the screws and the adapters 43 as before. It will be appreciated that, when mounting the die parts on the die shoe after machining the bores 33 in the die shoe, the temporary fastenings may be replaced in the two completed openings of the two different die parts instead of inserting the sleeves in those openings. The locations of the openings in the two die parts along with separate threaded holes 53

(see FIG. 4) in each die part are picked up and set on the jig bore machine for subsequently machining aligned openings and holes in the stripper. Thereafter, a spacer (not shown) is placed on the die parts and the stripper is clamped to the die parts on top of the spacer with punch openings 54 in the stripper aligned vertically with the corresponding punch openings 55 (see FIG. 5) in the die parts. Bores 56 and counterbores 57 then are machined in the stripper precisely in alignment with the openings 16 in the two die parts and counter bored holes 59 are drilled in the stripper in vertical alignment with the two threaded holes 53. Once the bores, counterbores and holes are completed, the stripper is unclamped from the die parts and the spacer is removed as well as the temporary fastenings in the two openings. Assembly of the stripper, die parts and die shoe is completed by replacing the stripper on the die parts and inserting an elongated sleeve 15a and screw 19a into the stripper bores and counterbores and tightening the screws in the holes 20 in the die shoe 13 to locate the stripper precisely on the die parts. In addition, hold down screws 60 are telescoped through the holes 59 and tightened in the threaded holes 53 to further fasten the stripper on the die parts thereby completing the assembly of the stripper, die parts and die shoe.

Thus, as seen from the foregoing, the present invention brings to the art a unique joint structure 10 and method for using such structure to locate and secure the series of die parts 11 precisely with respect to each other on the die shoe 13. Advantageously, the inside diameters of the sleeves 15 are larger than the diameters of the screws 19 enabling both the screws and sleeves to fit within the openings 16 to precisely locate and secure the parts on the die shoe regardless of whether the axes 26 of the screws are precisely aligned with the axes 25 of the sleeves. This enables the die parts initially to be secured temporarily in reasonably accurate positions on the die shoe so that the parts may be easily removed and machined where required in order to shift the die parts from their initially accurate positions into the precise positions required. Then, the bores 33 are machined in the die shoe to complete the openings 16 to receive the sleeves and screws so the parts are fixed against moving horizontally from their precisely located positions once the screws are tightened in the holes 20. Thereafter, the stripper 51 is mounted on the die parts in a similar manner to complete the die assembly 14 ready for usage.

Figures 6, 7:
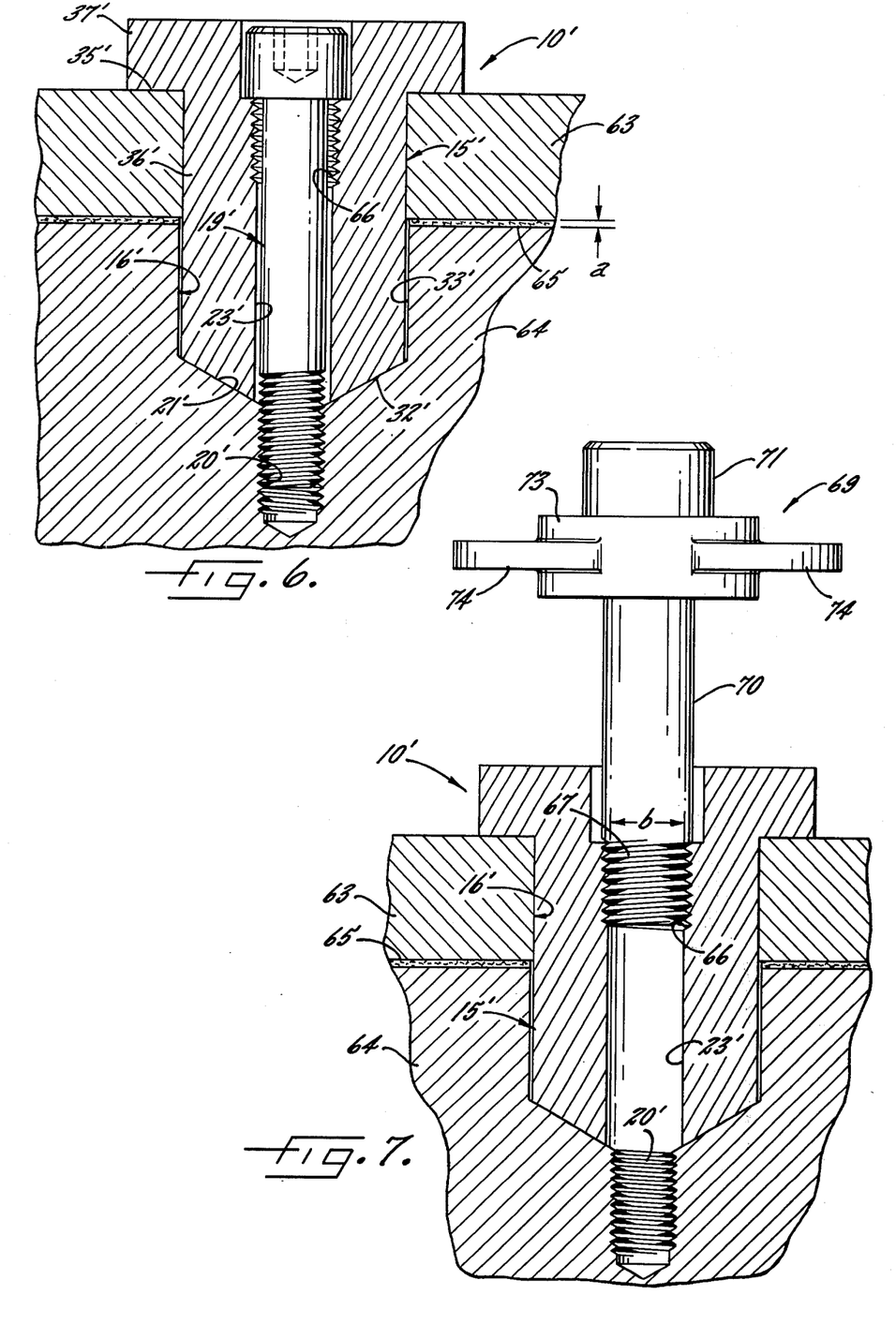
FIG. 6 is a fragmentary cross-section view of two members held together by an alternative embodiment of the joint structure of the present invention.
FIG. 7 is a fragmentary view similar to FIG. 6 but showing parts removed and a tool for removing other parts of the joint structure from the members.

While the joint structure 10 described thus far is adapted particularly for use in locating and securing the die parts 11 on the die shoe 13, with a slight modification in the joint structure, it also may be adapted for use in tightening together two members 63 and 64 (see FIG. 6) where it is desirable to limit the extent to which a third member 65 is compressed between the other two members and to do so independently of the torque applied when tightening such members together. The joint structure 10' for achieving the foregoing advantages is illustrated in FIG. 6 wherein parts of the structure corresponding to the earlier described joint structure are identified by the same but primed reference numbers.

In this form of the invention, the compressible member is contemplated as being a gasket 65 which is sandwiched between the upper member 63 and the lower member 64 and is compressed to a predetermined thickness $a$ without being compressed excessively to cause a leak between the upper and lower members once the two are secured together. As shown in FIG. 6, the bore 33' in the lower member is machined to a predetermined depth and the length of the body 36' of the sleeve 15' is equal to the compressed thickness $a$ of the gasket plus the depth of the bore plus the thickness of the upper member as measured between the flange abutting surface or shoulder 35' and the underside of such member. Accordingly, when the screw 19' is tightened in the hole 20' to secure the sleeve within the opening 16', the lower end 32' of the body abuts the lower end 21' of the opening to limit the extent to which the gasket may be compressed. By virtue of the foregoing construction of the joint structure 10', the screw and sleeve are kept from applying an excessive compressive force on the gasket regardless of the magnitude of the tightening torque applied to the screw. Thus, the screw may be threaded into the hole and tightened to the extent that the screw is kept from being unintentionally loosened such as from vibrations or the like between the upper and lower members without having to limit the torque applied to the screw during tightening in order to avoid excessively compressing the gasket.

As shown in FIG. 8, a tapped threaded portion 66 is formed in the upper margin of the inside wall surface 23' of the sleeve 15' and mates with a threaded section 67 of a tool 69 particularly adapted for removing the sleeve from the opening 20' of the joint structure 10'. Preferably, the tip diameter $b$ of the thread is equal to or greater than the diameter defined by the inside wall surface 23' of the sleeve to provide suitable clearance between the screw 19' and such thread when locating the upper member on the lower member.

Herein, the tool 69 comprises a shank 70 with the threaded section 67 located at one end thereof and an enlarged head 71 integrally formed with the opposite end of the shank. A cross piece 73 having handles 74 at opposite ends thereof is telescoped onto the shank to abut the underside of the head so that when the shank is mated with the threaded portion 66 of the inside sleeve wall the sleeve may be pulled out of the opening 16' by lifting on the cross piece. The exemplary tool shown in FIG. 7 is adapted particularly for use when removing the sleeve from the opening when the hole 20' in the lower member 64 is a blind hole. It will be appreciated, however, that other tool forms would be suitable for use in removing the sleeve when the hole is formed completely through the lower member.

Thus, it is seen that the joint structure 10' of the present invention also may be used to advantage in locating and securing together the upper and lower members 63 and 64 without excessively compressing the gasket 65 sandwiched between such members. For this purpose, the joint structure is constructed so that the length of the body 36' of the sleeve 15' equals the thickness of the upper member plus the compressed thickness of the gasket and the depth of the bore 33' in the lower member thereby limiting the distance which the gasket may be compressed independently of the amount of torque applied to the screw 19' when tightening the latter within the hole 20'.

I claim as my invention:

1. A joint structure for precisely locating and securing an upper member on a lower member including an opening extending through said upper member and into said lower member, said opening including first and second generally cylindrical bores of the same diameter formed in said upper and lower members, respectively, said bores being axially aligned with each other when said upper member is precisely located with respect to said lower member, said opening having an upper end with a diameter at least as large as the diameter of the bores, a generally cylindrical sleeve having a fixed outside diameter substantially equal to the diameters of said bores and being telescoped into said bores with a slip fit to extend between said upper and lower members, a threaded hole opening into said second bore and extending downwardly into said lower member from the bottom of said second bore, a screw having an enlarged head and a threaded shank integrally formed with said head, said shank having a diameter substantially less than the inside diameter of said sleeve and being telescoped through said sleeve and mated with said hole regardless of whether the axis of said hole coincides with the axis of said sleeve, and means including a lower surface integrally formed with the head of said screw and an abutting surface fixed with respect to said upper member and engaging said lower surface so as to support said screw vertically within said opening to tighten the upper member toward said lower member within said precisely located position with respect to said lower member.

2. A joint structure as defined by claim 1 wherein said sleeve includes an annular flange connected thereto adjacent the upper end thereof and extending radially outward beyond the diameter of said first bore for abutting engagement said upper member.

3. A joint structure as defined by claim 2 including a generally cylindrical recess formed in the upper end portion of said sleeve and concentric with the axis of said sleeve, said recess having a diameter substantially greater than the diameter of the head of said screw.

4. A joint structure as defined by claim 3 wherein said flange is formed integrally with said sleeve.

5. A joint structure as defined by claim 4 wherein said opening includes a counterbore formed in said upper member at the upper end of said opening and concentric with the axis of said opening, said counterbore having a diameter substantially equal to a diameter as measured across said flange and having a depth substantially greater than the axial thickness of said flange.

6. A joint structure as defined by claim 5 wherein said sleeve includes a lower end spaced axially upward from the bottom of said second bore.

7. A joint structure as defined by claim 6 wherein said sleeve includes a lower body portion extending into said second bore and having a length at least as great as one-fourth the diameter of said sleeve.

8. A joint structure as defined by claim 7 including an annular groove formed in the shank of said screw below the lower end of said sleeve body, a clip ring secured within said groove to captivate said sleeve on said screw between said head and said groove.

9. A joint structure as defined by claim 4 including an intermediate member sandwiched between said upper and lower members and being compressed to a predetermined thickness, said sleeve having a body with a length equal to the combined lengths of said first bore and said second bore plus the compressed thickness of said intermediate member.

10. A joint structure for precisely locating and securing an upper member on a lower member including a generally cylindrical opening extending through said upper member and into said lower member, a threaded hole formed within said lower member below said opening and opening into the bottom of said opening, a generally cylindrical sleeve telescoped into said opening and extending between said upper and lower members to precisely locate said upper member with respect to said lower member, a screw having an enlarged head of predetermined diameter and a threaded shank extending through said sleeve and being threaded into said hole to secure said upper member on said lower member, said opening comprising first and second cylindrical bores of the same diameter formed in the lower portion of said upper member and the upper portion of said lower member, respectively, and being axially aligned with each other when said upper member is located precisely with respect to said lower member, said opening further including a counterbore formed in the upper portion of said upper member, concentric with said first bore and having a diameter substantially larger than the diameter of said first bore, a radially extending shoulder formed with said opening by said counterbore a predetermined distance below the upper surface of said upper member, said sleeve having a generally cylindrical body with fixed inside and outside diameters, an annular flange integrally formed with the upper end portion of said body and extending in a generally radial direction outwardly from said body and a concentric, circular recess formed within the upper end portion of said sleeve and having a diameter substantially larger than the predetermined diameter of the head of said screw, said outside diameter of said sleeve being substantially equal to the diameter of said first bore and said inside diameter of said sleeve being substantially larger than the diameter of said screw shank, said sleeve having a diameter measured across said flange substantially equal to the diameter of said counterbore and said flange having an axial thickness substantially less than the predetermined distance said shoulder is located below the upper surface of said upper member, said sleeve being telescoped into said opening with said flange abutting said shoulder and said screw extending through said sleeve with said head nested within said recess and said shank being threaded into said hole to secure said upper member precisely on said lower member regardless of whether the axis of said hole coincides with the axis of said sleeve.

11. A joint structure for locating and securing an upper member on a lower member with an intermediate compressible member sandwiched between said upper and lower members and compressed to a preselected thickness, said joint structure comprising an opening extending through both said upper member and said intermediate member and into said lower member, said opening including first and second bores of the same diameter formed in said upper and lower members, respectively, said bores being axially aligned with each other when said upper member is located precisely with respect to said lower member, said second bore having a bottom spaced a predetermined distance below the upper surface of said lower member, a generally cylindrical sleeve having a body of preselected length with a fixed outside diameter substantially equal to the diameter of said first bore and being telescoped into said bores to extend between said upper and lower members and an annular flange integrally formed with the upper end of said body and extending outwardly therefrom in a generally radial direction beyond the diameter of said first bore to abut with said upper member to support said sleeve vertically within said opening, said sleeve body having a length equal to the combined lengths of said first and second bores plus the preselected, compressed thickness of said intermediate member, a threaded hole opening into said second bore and extending downwardly into said lower member from the bottom of said second bore, a screw having an enlarged head and a threaded shank integrally formed with said head, said shank having a diameter substantially less than the inside diameter of said sleeve and being telescoped through said sleeve and threaded into said hole to secure said upper member on said lower member with said sleeve abutting the bottom of said second bore so said intermediate member is compressed to said preselected thickness regardless of whether the axis of said hole coincides with the axis of said sleeve.

12. A joint structure as defined by claim 11 including a threaded section formed within said sleeve in the inside thereof to aid in the removal of said sleeve from said opening.

* * * * *